(12) United States Patent
Wisselmann et al.

(10) Patent No.: US 9,022,267 B2
(45) Date of Patent: May 5, 2015

(54) HOLDER APPARATUS FOR A PORTABLE ELECTRONIC DEVICE

(71) Applicant: Bayerische Motoren Werke Aktiengesellschaft, Munich (DE)

(72) Inventors: Dirk Wisselmann, Dachau (DE); Michael Bross, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/649,860

(22) Filed: Oct. 11, 2012

(65) Prior Publication Data

US 2013/0119102 A1    May 16, 2013

Related U.S. Application Data

(63) Continuation of application No. PCT/EP2011/001378, filed on Mar. 19, 2011.

(30) Foreign Application Priority Data

Apr. 13, 2010    (DE) .......................... 10 2010 003 888

(51) Int. Cl.
    *B60R 11/02*    (2006.01)
    *B60R 11/00*    (2006.01)

(52) U.S. Cl.
    CPC .............. *B60R 11/00* (2013.01); *B60R 11/0241* (2013.01); *B60R 2011/0075* (2013.01); *Y10S 224/929* (2013.01)

(58) Field of Classification Search
    USPC ......... 224/929, 483, 539, 542, 552, 567, 571; 455/575.8, 575.9; 248/688; 379/446, 379/449, 450, 454, 455; 361/679.59
    See application file for complete search history.

(56) References Cited

U.S. PATENT DOCUMENTS

| | | | | |
|---|---|---|---|---|
| 2,621,807 A | * | 12/1952 | Rendich | ........................ 269/54.5 |
| 4,222,695 A | * | 9/1980 | Sarides | ........................... 410/68 |
| 4,538,737 A | * | 9/1985 | Delaney | ..................... 211/71.01 |
| 4,637,303 A | * | 1/1987 | Lucky | ............................. 99/426 |

(Continued)

FOREIGN PATENT DOCUMENTS

| | | |
|---|---|---|
| DE | 295 01 774.0 | 4/1995 |
| DE | 199 58 325 A1 | 6/2001 |

(Continued)

OTHER PUBLICATIONS

Combs, Steven; Rotating Lego iPhone/iPod Trouch Dock; Sep. 8, 2009; https://www.youtube.com/watch?v=0PTE7P3JTGo.*

(Continued)

*Primary Examiner* — Justin Larson
*Assistant Examiner* — Phillip Schmidt
(74) *Attorney, Agent, or Firm* — Crowell & Moring LLP

(57) ABSTRACT

A holder apparatus is provided for a portable electronic device, in particular in a motor vehicle. The portable electronic device is designed for bidirectional data transfer with the motor vehicle, wherein the holder apparatus has a base element which can be fixed in the motor vehicle and which has a plurality of holder elements, and at least one wall and/or cover element which is coupled to the holder elements such that it can be reversibly plug-connected. The portable electronic device can be secured in the holder apparatus in an interlocking and/or force-fitting manner by the base element and the at least one wall and/or cover element.

18 Claims, 2 Drawing Sheets

(56) References Cited

U.S. PATENT DOCUMENTS

| | | | |
|---|---|---|---|
| 4,865,237 A * | 9/1989 | Allen | 224/552 |
| 4,941,784 A * | 7/1990 | Flament | 410/121 |
| 5,782,185 A | 7/1998 | Frahm et al. | |
| 5,947,359 A * | 9/1999 | Yoshie | 224/570 |
| 6,241,439 B1 * | 6/2001 | Weber | 410/94 |
| 6,503,036 B1 * | 1/2003 | Bequette et al. | 410/94 |
| 6,648,569 B2 * | 11/2003 | Douglass et al. | 410/46 |
| 6,890,138 B1 * | 5/2005 | Myrick | 410/94 |
| 7,517,244 B2 | 4/2009 | Piekarz | |
| 7,731,026 B2 * | 6/2010 | Harrison | 206/349 |
| 8,238,984 B2 | 8/2012 | Pursche et al. | |
| 8,303,221 B2 * | 11/2012 | Lenz | 410/140 |
| 2002/0158512 A1 | 10/2002 | Mizutani et al. | |
| 2002/0190183 A1 * | 12/2002 | Haas | 248/503 |
| 2003/0045332 A1 | 3/2003 | Lopez et al. | |
| 2007/0045495 A1 * | 3/2007 | Asano et al. | 248/309.1 |
| 2007/0235488 A1 * | 10/2007 | Wang | 224/539 |
| 2007/0278274 A1 | 12/2007 | Dunn | |
| 2008/0079388 A1 * | 4/2008 | Sarnowsky et al. | 320/103 |

FOREIGN PATENT DOCUMENTS

| | | |
|---|---|---|
| DE | 101 23 556 C2 | 7/2003 |
| DE | 10 2005 020 762 B3 | 11/2006 |
| DE | 10 2006 034 128 A1 | 10/2007 |
| GB | 2 451 899 A | 2/2009 |

OTHER PUBLICATIONS

German Search Report dated Nov. 29, 2010 including partial English-language translation (Nine (9) pages).

International Search Report dated Jun. 17, 2011 including English-language translation (Six (6) pages).

International Preliminary Report on Patentability (PCT/IB/373) and Written Opinion (PCT/ISA/237) dated Oct. 16, 2012 (Six (6) pages).

* cited by examiner

HOLDER APPARATUS FOR A PORTABLE ELECTRONIC DEVICE

CROSS REFERENCE TO RELATED APPLICATIONS

This application is a continuation of PCT International Application No. PCT/EP2011/001378, filed Mar. 19, 2011, which claims priority under 35 U.S.C. §119 from German Patent Application No. DE 10 2010 003 888.1, filed Apr. 13, 2010.

BACKGROUND AND SUMMARY OF THE INVENTION

The invention relates to a holder device for a portable electronic device, in particular in a motor vehicle.

A holder device of this type is known from DE 10 2006 034 128 A1. This system for accommodating a mobile telephone in a compartment that is configured to be provided inside a motor vehicle and that is electromagnetically shielded against the emission of radio signals from the mobile telephone comprises: a connector for transmitting an antenna signal from an antenna of the motor vehicle to the mobile telephone and an electromagnetically shielded housing with an opening for inserting the mobile telephone into the housing and for removing the mobile telephone from the housing.

The object of the present invention is to provide a holder device that is configured for a portable electronic device, in particular in a motor vehicle, and that allows the portable electronic device to be reliably operated and may be manufactured in an inexpensive way.

The invention is distinguished by a holder device for a portable electronic device, in particular in a motor vehicle. The portable electronic device is designed for a bi-directional data transfer with the motor vehicle. The holder device has a base element, which can be secured in the motor vehicle and which has a plurality of holder elements, and at least one wall element and/or cover element, which is (are) coupled to the holder elements in such a way that the at least one wall element and/or cover element can be reversibly plugged in. The portable electronic device can be secured in the holder device in a shape locking and/or force locking manner by means of the base element and the at least one wall element and/or cover element.

This arrangement has the advantage that the holder device offers a simple possibility of being able to adapt to the structural form of the portable electronic device due to the fact that the at least one wall element and/or cover element can be plugged into the base element. This feature also applies, in particular, to such structural forms of portable electronic devices that are not often found on the market. Furthermore, when the motor vehicle is used by a number of persons or when the portable electronic device is frequently replaced, the holder device can be adapted in a simple and fast way; and, as a result it is possible to achieve a high degree of convenience and comfort when using the vehicle. In summary, this arrangement allows the holder device to be adapted in a simple way to the respective portable electronic devices that are to be accommodated.

In one advantageous embodiment the holder elements are arranged in an orthogonal grid. This arrangement has the advantage that it is possible to achieve an arrangement and a precisely fitting positioning of, in particular portable electronic devices, which are arranged at right angles, in the holder device.

In an additional advantageous embodiment the holder elements are designed as pins. This feature has the advantage that the at least one wall element and/or cover element can be easily connected to the base element in such a way that the at least one wall element and/or cover element is (are) flexible.

In another advantageous embodiment the at least one wall element and/or cover element is (are) arranged in a shape locking and/or force locking manner between the holder elements that are designed as pins. This arrangement has the advantage that a reliable shape locking and/or force locking connection can be produced between the wall elements and/or the cover elements and the base element.

In an additional advantageous embodiment the at least one wall element and/or cover element has (have) recesses; and the holder elements, which are designed as pins, are arranged in a shape locking and/or force locking manner in the at least one wall element and/or cover element. This arrangement has the advantage that an especially reliable shape locking and/or force locking connection can be produced between the wall elements and/or the cover elements and the base element.

In another advantageous embodiment the holder elements have recesses; and the at least one wall element and/or cover element has (have) pins; and the pins of the at least one wall element and/or cover element are arranged in a shape locking and/or force locking manner in the recesses of the holder elements. This arrangement has the advantage that an especially reliable shape locking and/or force locking connection can be produced between the wall elements and/or the cover elements and the base element.

In an additional advantageous embodiment the base element has an induction element, which is configured to be electrically connected to a power source and which is arranged and configured to be inductively coupled to the portable electronic device. This arrangement has the advantage that the portable electronic device can be wirelessly charged at the power source. As a result, the base element and the at least one wall element and/or cover element enable (enables) a precise positioning of the portable electronic device relative to the inductive element.

In another advantageous embodiment the base element has an antenna element, which is configured to provide a wireless transfer of a radio signal from and to the portable electronic device. This arrangement has the advantage that there exists a simple and reliable possibility of a bi-directional data transfer between the portable electronic device and the motor vehicle. Owing to the precise positioning of the portable electronic device by means of the wall elements and/or the cover elements in the holder device, the portable electronic device can have a good transmitting and receiving quality by way of the antenna element.

In an additional advantageous embodiment the portable electronic device is a mobile telephone, a personal digital assistant, a portable media player device or a portable tablet computer.

The exemplary embodiments of the invention are explained in detail below with reference to the schematic drawings.

DETAILED DESCRIPTION OF THE DRAWINGS

Figure 1:
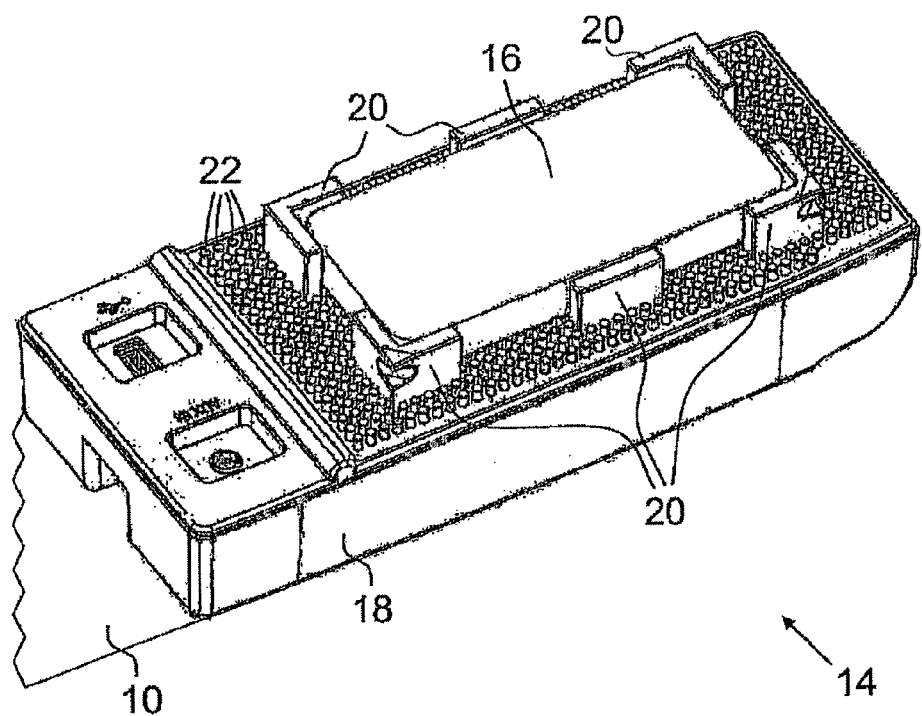
FIG. 1 is a perspective view of a holder device with a portable electronic device.

Elements of identical construction or function are provided with the same reference numerals in all of the figures.

The figures show, in each instance, a holder device 14, which is disposed preferably in a motor vehicle 10. A portable electronic device 16 is disposed in the holder device 14. A data transfer can take place between the electronic device 16 and the motor vehicle 10 in both directions. The portable electronic device 16 is, in particular, a mobile telephone, a personal digital assistant, a portable media player device or a portable tablet computer.

The holder device 14 has a base element 18 and at least one wall element and/or cover element 20. Preferably the holder device 14 has a plurality of wall elements and/or cover elements 20. The base element 18 is securely coupled to the motor vehicle 10. In particular, the base element 18 is securely coupled to a center console or a door of the motor vehicle 10. The base element 18 is designed, in particular, in the form of a plate and, thus, makes it possible to house the various connecting and transfer elements, a feature that will be described in detail below.

Figure 2:
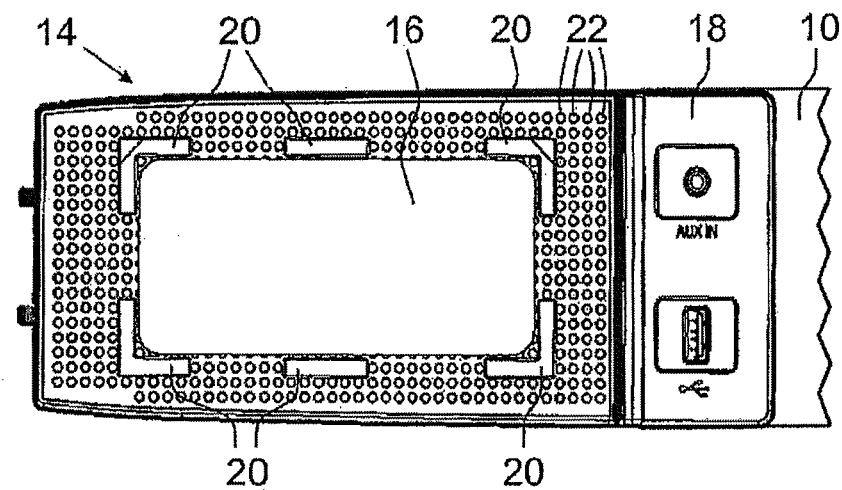
FIG. 2 is a top view of the holder device with the portable electronic device.

The wall elements and/or cover elements 20 are designed preferably in the form of a plate or as angle elements. In the embodiment of the holder device 14 depicted in FIGS. 1 and 2, four of the wall elements and/or cover elements 20 are designed, for example, as angle elements; and two other wall elements and/or cover elements 20 are designed in the form of a plate.

The base element 18 has a plurality of holder elements 22. In the illustrated embodiment the holder elements 22 are designed as pins. The holder elements 22 are arranged preferably in an orthogonal grid. In a preferred embodiment the wall elements and/or cover elements 20 have recesses, with which the holder elements 22, which are designed as pins, engage. In an additional embodiment the wall elements and/or cover elements 20 are arranged between the holder elements 22, which are designed as pins. As a result, the wall elements and/or cover elements 20 are coupled to the base element 18 in such a way that they can be reversibly plugged in.

In an alternative embodiment which is not shown, the holder elements 22 have recesses; and the wall elements and/or cover elements 20 have pins. The pins of the wall elements and/or cover elements 20 are arranged in the recesses of the holder elements 22, so that the wall elements and/or cover elements 20 are coupled to the base element 18 in such a way that they can be reversibly plugged in.

The portable electronic device 16 is arranged inside a region that is enclosed by the wall elements and/or cover elements 20. In the embodiment, depicted in FIGS. 1 and 2, the portable electronic device 16 is arranged in a shape locking manner inside a region that is formed by the four right angled wall elements and/or cover elements 20 and by the two plate-shaped wall elements and/or cover elements 20. If the wall elements and/or cover elements 20 are configured to be springy or elastic, so that they exert a pressure on the outer regions of the portable electronic device 16, then the portable electronic device 16 can also be secured in a force locking manner in the holder device 14.

Figure 3:
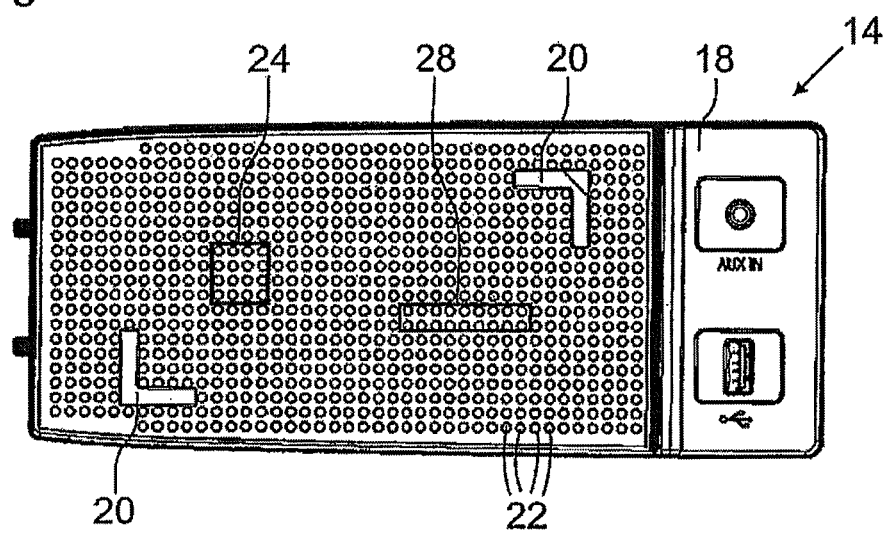
FIG. 3 is another top view of a holder device without the portable electronic device.

Preferably an induction element 24 is arranged in the base element 18 (FIG. 3). The induction element 24 is positioned in such a way that it is situated in the vicinity of a corresponding induction element of the portable electronic device 16. The induction element 24 is electrically coupled to a power source. The induction element 24, which is arranged in the base element 18, enables an inductive coupling with the corresponding induction element, which is arranged in the portable electronic device 16. As a result, the portable electronic device 16 can be charged by means of the induction element 24.

In an alternative embodiment the base element 18 has an electric connecting element, which is designed as a socket or a plug. The electric connecting element, which is designed as a socket or a plug, is coupled to the power source. In this case the portable electronic device 16 is electrically coupled to the electric connecting element, which is designed as a socket or a plug. This feature allows the portable electronic device 16 to be charged in a simple way.

Furthermore, an antenna element 28 is arranged in the base element 18; and a wireless transmission of radio signals between the antenna element 28 and the portable electronic device 16 can be achieved by means of the antenna element (FIG. 3).

Since the wall elements and/or cover elements 20 can be plugged into the base element 18 in a reversible manner, the portable electronic device 16 can be arranged in the holder device 14 in a shape locking and/or force locking manner. This arrangement makes it possible to achieve a very precise positioning of the portable electronic device 16 relative to the holder device 14. This feature is particularly advantageous, because the induction element 24, which is arranged in the base element 18, should be positioned very precisely relative to the portable electronic device 16, in order to make it possible to charge the accumulator of the portable electronic device 16.

Due to the possibility of being able to plug the wall elements and/or cover elements 20 into the base element 18 in a reversible manner, the holder device 14 can be adapted to the structural form of the portable electronic device 16. Hence, it is possible to adapt the holder device 14 to the various terminal devices by unplugging and then rearranging the wall elements and/or cover elements. Owing to the precise positioning of the portable electronic device 16 relative to the holder device 14 and, thus, relative to the induction element 24, it is possible to dispense with an adaptation of the antenna element 28; and, hence, an optimization of the receiving and transmission properties of the portable electronic device 16 can be achieved. This feature is particularly advantageous, if the portable electronic device 16 is a mobile telephone.

The holder device 14 that is shown makes it possible to use different kinds and designs of portable electronic devices 16 in the holder device 14 without having to dispense with important functions, such as the charging of the portable electronic device 16 or an electric coupling of the antenna of the portable electronic device 16 to a vehicle antenna. The ease, with which the wall elements and/or cover elements 20 can be interchanged, makes it possible to achieve a high degree of comfort even when a number of persons are using the vehicle or when the portable electronic device 16 is frequently replaced.

LIST OF REFERENCE NUMERALS 10 motor vehicle
14 holder device
16 portable electronic device
18 base element
20 wall element and/or cover element
22 holder element of 18
24 induction element of 18
28 antenna element of 18

The invention claimed is:

1. A holder device for a portable electronic device in a motor vehicle, wherein the portable electronic device is designed for a bi-directional data transfer with the motor vehicle, wherein the holder device comprises:

a base element, which is securable in the motor vehicle and which has a plurality of holder elements; and at least one wall element and/or cover element, which is operatively configured to couple with the holder elements such that the at least one wall element and/or cover element and the holder elements are reversibly pluggable into one another, wherein the portable electronic device is securable in the holder device in a force locking manner via contact with an outer surface of the at least one wall element and/or cover element, the holder elements have recesses, the at least one wall element and/or cover element has pins, and the pins of the at least one wall element and/or cover element are arranged in a shape locking and/or force locking manner in the recesses of the holder elements.

2. The holder device according to claim 1, wherein the at least one wall element and/or cover element secure the portable electronic device in the holder device in the shape locking manner.

3. The holder device according to claim 2, wherein the holder elements form an orthogonal grid.

4. The holder device according to claim 3, wherein the holder elements are designed as pins.

5. The holder device according to claim 2, wherein the holder elements are designed as pins.

6. The holder device according to claim 5, wherein the at least one wall element and/or cover element is arranged in the at least one of the shape locking and force locking manner between the holder elements, which are designed as pins.

7. The holder device according to claim 4, wherein the at least one wall element and/or cover element is arranged in the at least one of the shape locking and force locking manner between the holder elements, which are designed as pins.

8. The holder device according to claim 4, wherein the at least one wall element and/or cover element has recesses; and the holder elements, which are designed as pins, are arranged in the shape locking and/or force locking manner in the recesses of the at least one wall element and/or cover element.

9. The holder device according to claim 5, wherein the at least one wall element and/or cover element has recesses; and the holder elements, which are designed as pins, are arranged in the shape locking and/or force locking manner in the recesses of the at least one wall element and/or cover element.

10. The holder device according to claim 2, wherein the base element has an induction element, which is configured to be electrically connected to a power source and which is arranged and configured to be inductively coupled to the portable electronic device.

11. The holder device according to claim 2, wherein the base element has an antenna element, which is configured to provide a wireless transfer of a radio signal from and to the portable electronic device.

12. The holder device according to claim 2, wherein the base element has an antenna element, which is configured to provide a wireless transfer of a radio signal from and to the portable electronic device.

13. The holder device according to claim 2, wherein the portable electronic device is at least one of a mobile telephone, a personal digital assistant, a portable media player device and a portable tablet computer.

14. The holder device according to claim 11, wherein the portable electronic device is at least one of a mobile telephone, a personal digital assistant, a portable media player device and a portable tablet computer.

15. The holder device according to claim 12, wherein the portable electronic device is at least one of a mobile telephone, a personal digital assistant, a portable media player device and a portable tablet computer.

16. The holder device according to claim 1, wherein the outer surface of the at least one wall element and/or cover element contacts an outer surface of the portable electronic device.

17. The holder device according to claim 16, wherein the surface of the at least one wall element and/or cover element is springy or elastic, so as to exert a motion-resistive force on the outer surface of the portable electronic device, thereby securing the portable electronic device in the holder device in the force locking manner.

18. A holder device for a portable electronic device in a motor vehicle, wherein the portable electronic device is designed for a bi-directional data transfer with the motor vehicle, wherein the holder device comprises:

a base element, which is securable in the motor vehicle and which has a plurality of holder elements; and at least one wall element and/or cover element, which is operatively configured to couple with the holder elements such that the at least one wall element and/or cover element and the holder elements are reversibly pluggable into one another, wherein the portable electronic device is securable in the holder device in at least one of a shape locking and force locking manner by the base element and the at least one wall element and/or cover element, the holder elements have recesses, the at least one wall element and/or cover element has pins, and the pins of the at least one wall element and/or cover element are arranged in the shape locking and/or force locking manner in the recesses of the holder elements.

* * * * *